(12) United States Patent
Ganguli et al.

(10) Patent No.: US 8,579,235 B2
(45) Date of Patent: *Nov. 12, 2013

(54) TECHNIQUE FOR DE-ORBITING SMALL DEBRIS FROM THE NEAR-EARTH SPACE ENVIRONMENT

(71) Applicants: Gurudas Ganguli, Arlington, VA (US); Scott S. Chappie, Arlington, VA (US); Leonid I. Roudakov, San Diego, CA (US); Christopher E. Crabtree, Springfield, VA (US)

(72) Inventors: Gurudas Ganguli, Arlington, VA (US); Scott S. Chappie, Arlington, VA (US); Leonid I. Roudakov, San Diego, CA (US); Christopher E. Crabtree, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,336

(22) Filed: May 3, 2013

(65) Prior Publication Data

US 2013/0240675 A1 Sep. 19, 2013

Related U.S. Application Data

(63) Continuation of application No. 13/017,813, filed on Jan. 31, 2011, now Pat. No. 8,469,314.

(60) Provisional application No. 61/300,871, filed on Feb. 3, 2010.

(51) Int. Cl.
*B64G 1/00* (2006.01)
*B64G 1/10* (2006.01)

(52) U.S. Cl.
USPC .............. 244/158.1; 244/158.3; 244/158.6; 244/158.7

(58) Field of Classification Search
USPC ................ 244/158.1, 158.6, 158.7, 158.3
See application file for complete search history.

(56) References Cited

U.S. PATENT DOCUMENTS

| | | | |
|---|---|---|---|
| 4,936,528 A * | 6/1990 | Butner et al. ............... | 244/171.7 |
| 5,082,211 A | 1/1992 | Werka | |
| 5,108,046 A | 4/1992 | Chaumette et al. | |
| 5,405,108 A | 4/1995 | Marin, Jr. et al. | |
| 6,655,637 B1 | 12/2003 | Robinson | |
| 6,830,222 B1 | 12/2004 | Nock et al. | |
| 7,118,075 B2 * | 10/2006 | Schubert ...................... | 244/169 |
| 2007/0285304 A1 * | 12/2007 | Cooper ........................... | 342/62 |
| 2010/0193640 A1 | 8/2010 | Atmur et al. | |
| 2011/0210208 A1 | 9/2011 | Ganguli et al. | |

OTHER PUBLICATIONS

Provisional U.S. Appl. No. 61/300,871, filed Feb. 3, 2010; Confirmation No. 5310; Inventor Gurudas Ganguli, Technique for De-Orbiting Small Debris From the Near-Earth Space Environment (2010).

(Continued)

*Primary Examiner* — Tien Dinh
*Assistant Examiner* — Michael Wang
(74) *Attorney, Agent, or Firm* — US Naval Research Laboratory; Kathleen Chapman

(57) ABSTRACT

System and method for inducing rapid reentry of orbital debris including determining a spatial extent of the orbital debris, and deploying dust to the orbital debris to enhance the drag on the orbital debris. Small objects with perigee above about 900 km where the debris lifetime can be centuries can be targeted for de-orbiting.

16 Claims, 15 Drawing Sheets

(56) References Cited

OTHER PUBLICATIONS

Obermark J. et al., SUMO/FREND: Vision Systems, System for Autonomous Satellite Grapple, Sensors and Systems for Space Applications, edited by Richard T. Howard, Robert D. Richards, Proc. of SPIE vol. 6555, 65550Y, 2007: • 0277-786X/07/$18 • doi: 10.1117/12.720284.

Liou, J.C. and Johnson, N. L. Risks in Space from Orbiting Debris, Science, 311, 340, 2006.

Kessler, D. J. and B. G. Cour-Palais, Collision Frequency of Artificial Satellites: The Creation of a Debris Belt, J. Geophys. Res. 83, 2637, 1978.

Stansbery, E.G., et al., Characterization of the Orbital Debris Environment from Haystack Radar Measurements, Adv. Space Res., 16, No. 11, pp. (11)5-(11)16, 1995.

Space Mission Analysis and Design, 3rd Edition, James Wertz and Wiley Larson, editors, p. 210, Microcosm Press of Torrance, CA and Kluwer Academic Publishers of The Netherlands, 1999.

Johnson, N. L., E. Stansbery, J.C. Liou, M. Horstman, C. Stokely, D. Whitlock, The characteristics and consequences of the break-up of the Fengyun-1C spacecraft, Acta Astronautica, 63, 128, 2008.

Johnson, N. L., P. H. Krisko, J.C. Liou, P. D. Anz-Meador, NASA's New Breakup Model of Evolve 4.0, Adv. Space Res. 28, 1377, 2001.

Liou, J.C., N. L. Johnson, Characterization of the cataloged Fengyun-1C fragments and their long-term effect on the LEO environment, Adv. Space Res., 43, 1407, 2009.

Zel'Dovich, Ya. B. and Yu. P. Raizer, Physics of Shock Waves and High-Temperature Hydrodynamic Phenomena, New York: Dover Publications, 2002.

Wells, B.K., Hypervelocity impact tests on coated thermoplastic films at cryogenic and elevated temperatures, Int J Impact Eng, 33, 855, 2006.

Janches D, et al., Modeling the global micrometeor input function in the upper atmosphere observed by high power and large aperture radars, J. Geophys. Res., 111, A07317, doi 10.1029/2006JA011628, 2006.

Levin, G. and Christiansen, E., The Space Shuttle Program Pre-Flight Meteoroid and Orbital Debris Risk/ damage Predictions and Post-Flight Damage Assessments, Second European Conference on Space Debris, Organized by ESA, Mar. 17-19, 1997, ESOC, Darmstadt, Germany (1997), ESA-SP 393., p. 633.

Johnson, N. L., Monitoring the Heavens, Today and Tomorrow, PowerPoint presentation, http://www.cdi.org/PDFs/SSA3Johnson.pdf, 2006.

Takasawa, S., et. al., Silicate Dust Size Distribution from Hypervelocity Collisions: Implications for Dust Production in Debris Disks. The Astrophysical Journal Letters, 733:L39 (4pp), Jun. 2011.

C.A. Belk, et al, NASA-STD-8719.14, Process for Limiting Orbital Debris, Sep. 6, 2007.

"Fundamentals of Astrodynamics", Roger R. Bate, Donald D. Mueller, and Jerry E. White, Dover Publications, Chapter 9.7.2 p. 423 (Eq. 9.7-7), New York, 1971.

Love, S.G. and D. E. Brownlee, "A Direct Measurement of the Terrestrial Mass Accretion Rate of Cosmic Dust":, Science 262:550-553, 1993.

Belk, C.A., et al, NASA Reference Publication 1408, "Meteoroids and Orbital Debris: Effects on Spacecraft", Aug. 1997.

Wegener, P, H. Krag, D. Rex, J. Bendisch, and H. Klinkrad, "The Orbital Distribution and Dynamics of Solid Rocket Motor Particle Clouds for Implementation Into the Master Debris Model", Adv. Space Res., 23, 161, 1999.

Mueller, A. and D. Kessler, "The Effects of Particulates From Solid Rocket Motors Fired in Space", Adv. Space Res., 5, 77, 1985.

Kessler, D., N. Johnson, E. Stansbery, R. Reynolds, K. Siebold, M. Matney, and A. Jackson, "The Importance of Non-Fragmentation Sources of Debris to the Environment", Advances in Space Research, vol. 23, No. 1, pp. 149-159, 1999.

US Congressional Hearing, Subcommittee on Space and Aeronautics, "Keeping the Space Environment Safe for Civil and Commercial Users", Serial No. 111-22, Apr. 28, 2009.

NASA Preferred Reliability Practice No. PD-EC-1107, "Micrometeoroid Protection", May 1996.

Brandhorst, Jr., H.W., Hypervelocity impact studies of high voltage solar array segments, paper # IAC-02-R.P.06, 53rd International Astronautical Congress, The World Space Congress—2002, Oct. 10-19, 2002/Houston, Texas.

Zwiener, J. M. and M. M. Finckenor, "Micrometeoroid/Space Debris Effects on Materials", NASA Conference Publication 3257, 1992 {Parts 1 and 2}.

Young, L. E., "Impact of LDEF Photovoltaic Experiment Findings upon Spacecraft Solar Array Design and Development Requirements", NASA Conference Publication 3257, 1992 {Parts 1 and 2}.

Herbert, M. K., "Characterization of Rear Incident Hypervelocity Impact Phenomena on Hubble Space Telescope Solar Arrays", International Journal of Impact Engineering, 23, 377, 1999.

Liou, J.C., An Assessment of the Current LEO Debris Environment and What Needs to be Done to Preserve it for Future Generations, ESCG/ERC, Houston, USA, 2008.

Kessler, Donald L., Collisional Cascading: The Limits of Population Growth in Low Earth Orbit, Adv. Space Res. vol. 11, No. 12 pp. 12 (63)-12 (66), Houston, Texas, 1991.

Committee for the Assessment of NASA's Orbital Debris Programs; National Research Council, Summary of the Workshop to Identify Gaps and Possible Directions for NASA's Micrometeoroid and Orbital Debris, Programs, 2011.

Silverman, E. M., "Space Environmental Effects on Spacecraft: LEO Materials Selection Guide", NASA Contractor Report 4661, Aug. 1995 Part 1.

Silverman, E. M., "Space Environmental Effects on Spacecraft: LEO Materials Selection Guide", NASA Contractor Report 4661, Aug. 1995 Part 2.

Silverman, E. M., "Space Environmental Effects on Spacecraft: LEO Materials Selection Guide", NASA Contractor Report 4661, Aug. 1995 Part 3.

Silverman, E. M., "Space Environmental Effects on Spacecraft: LEO Materials Selection Guide", NASA Contractor Report 4661, Aug. 1995 Part 4.

Silverman, E. M., "Space Environmental Effects on Spacecraft: LEO Materials Selection Guide", NASA Contractor Report 4661, Aug. 1995 Part.

U.S. Appl. No. 13/017,813, Non-Final Rejection, Mail date Feb. 26, 2013.

Notice of Allowance, U.S. Appl. No. 13/017,813, dated Feb. 26, 2013.

\* cited by examiner

TECHNIQUE FOR DE-ORBITING SMALL DEBRIS FROM THE NEAR-EARTH SPACE ENVIRONMENT

CROSS-REFERENCE TO RELATED APPLICATIONS

This Application is a continuation of U.S. patent application Ser. No. 13/017,813 entitled A TECHNIQUE FOR DE-ORBITING SMALL DEBRIS FROM THE NEAR-EARTH SPACE ENVIRONMENT, filed on Jan. 31, 2011, which is a nonprovisional application of provisional application 61/300,871, entitled A TECHNIQUE FOR DE-ORBITING SMALL DEBRIS FROM THE NEAR-EARTH SPACE ENVIRONMENT, filed on Feb. 3, 2010, under 35 USC 119(e), the entire disclosures of which are incorporated herein by reference.

BACKGROUND

Methods and systems disclosed herein relate generally to de-orbiting objects in outer space, and in particular, de-orbiting debris from the highly populated sun synchronous orbit region by injecting micron scale dust grains in this region. Small objects, for example, but not limited to, space debris, can be difficult to track individually and remove, thus making small objects possibly dangerous to other orbiting objects. Referring now to FIG. 1, orbital debris with characteristic size of 10-1000 cm are shown to be far less numerous than orbital debris with characteristic size smaller than 10 cm. The small object population is localized at an altitude around 1000 km and between 50-100 degrees in inclination angle. The approximate lifetime of these small objects with perigee of 800 km or less and having a ballistic coefficient of three or less is approximately 25 years or less due to natural atmospheric drag. In an effort to reduce future accumulation of orbital debris, U.S. Government guidelines specify that space objects are to be de-orbited within 25 years of mission completion. (see "Process for Limiting Orbital Debris", NASA-STD 8719.14, published in 2007). Thus, what is needed is to relocate the orbits of the small object populations that peak around 1000 km altitude, that have lifetimes of centuries, to below an altitude so that they can be naturally de-orbited within 25 years or less. Space objects such as debris can be broadly classified into two categories: (i) large objects with dimension larger than 10 cm and (ii) small objects with dimension smaller than 10 cm. The smaller debris can be more numerous and can be difficult to detect and can be impossible to individually track. These characteristics can make them more dangerous than the fewer larger objects that can be tracked and hence avoided. In addition, there are several solutions for addressing larger objects, for example, DARPA/NRL's FREND device that can remove large objects from useful orbits and place them in graveyard orbits. However, damage from centimeter to millimeter size objects can be dangerous.

Referring now to FIG. 2A, a 4 mm diameter crater on the windshield of the Space Shuttle was created by impact of 0.2 mm paint chip. Referring now to FIG. 2B, a hole on an antenna of the Hubble space telescope was created by the impact of an object of less than 1 cm. These collisions could create vulnerability in space operations that could become more severe in the future. What is needed is a small object removal system and method that can address this vulnerability and that could ensure uninterrupted access to the near-earth space.

Referring now to FIG. 3A, an exemplary tracked object population is shown to be localized within about 50° of inclination angle. Referring now to FIG. 3B, objects in sun synchronous orbits, where most of the orbital debris is located, have nearly circular orbits. The larger trackable debris peaks around 800 km altitude. Referring now to FIG. 4, the smaller objects, although difficult to track individually, can be tracked statistically and the resulting distribution is roughly similar to the tracked objects shown in FIG. 3B but peaks at higher (~1000 km) altitude. Referring now to FIG. 5, the orbital lifetimes of objects as a function of their ballistic coefficient (B), defined as the mass to area ratio, are shown. Objects with B~3 peak around 1000 km and their lifetimes become 25 years or less below 900 km. Above 900 km the lifetimes can become centuries. Therefore, the task of small object removal is essentially to reduce the object orbit height from around 1100 km to below 900 km and then let nature take its course. For faster removal in less than 25 years the debris altitude may be lowered farther. There are about 900 active satellites and about 19,000 earth-orbiting cataloged objects larger than 10 cm. However, there are countless smaller objects that can be difficult to track individually. Unintentional (collision or explosion) or intentional fragmentation of satellites can increase the object population significantly. For example, the 2007 Chinese Anti-Satellite test generated 2400 large objects and countless smaller ones in the very popular sun synchronous orbit at about 865 km altitude. A similar increase of object population also resulted from the 2009 collision of an Iridium satellite with a spent Russian satellite. The object population is expected to rise substantially as more and more nations become space faring.

What are needed are a system and method to induce rapid reentry of orbital debris.

SUMMARY

To address the above-stated need, small objects with B~3-5 in orbits with perigee above about 900 km where the debris lifetime can be centuries can be targeted for de-orbiting. A method for inducing rapid reentry of orbital debris can include, but is not limited to including, the steps of determining a spatial extent of the orbital debris to be targeted, where the orbital debris has a first edge that is at a higher altitude than a second edge of the orbital debris, and deploying dust to the location to enhance the drag on the orbital debris. There are at least two ways to deploy the dust, through orbiting satellites and through ballistic methods shown, for example, in FIGS. 6A-6C and 7A-7C. The satellite method of deploying can include, but is not limited to including, the steps of determining the debris orbit of the orbital debris, selecting at least one satellite, the at least one satellite counter-orbiting with respect to the debris orbit, configuring the at least one satellite with the dust, and configuring the at least one satellite to release the dust in the debris orbit at the higher altitude edge of the orbital debris, the dust being released in a direction counter-rotating to the debris orbit. The ballistic method of deploying can include, but is not limited to including, the steps of determining a forward edge of the orbital debris, determining a forward edge location at a pre-selected time, equipping a space vehicle with the dust, launching the space vehicle to arrive at the forward edge location before the pre-selected time, and configuring the space vehicle to release the dust at the forward edge location at the pre-selected time to engulf the orbital debris as the orbital debris passes through the dust. Either method can further include the steps of selecting the dust based on dust properties, the dust properties at least minimizing adverse effects on active satellites, the dust properties causing a natural rate of decay of the orbit altitude of the dust to be roughly synchronized with a rate of artificial decay of the orbital debris, determining an amount of the dust based on the spatial extent of a dust cloud of the dust, the position of the orbital debris, and the amount of time of the interaction of the cloud with the orbital debris, determining the lifetime of the dust based on the dust properties, characteristics of the dust cloud, and solar radiation pressure on dust cloud, adjusting the density of the dust to include effects only on a pre-selected subset of the orbital debris, and lowering the altitude of the orbital debris to a desired altitude depending on their ballistic coefficients below which earth's natural drag is sufficient to de-orbit the debris within a desired time.

A system for inducing rapid reentry of orbital debris can include, but is not limited to including, a debris location processor for determining a spatial extent of the orbital debris, and a deployment processor for deploying dust to the orbital debris of the spatial extent to artificially enhance the drag on the orbital debris. The deployment processor can be, for example, but not limited to, a ballistic deployment processor or a satellite deployment processor. The ballistic deployment processor can include, but is not limited to including, a forward edge subprocessor for determining from the spatial extent of the orbital debris a forward edge of the orbital debris, and a time processor for determining a forward edge location of the forward edge at a pre-selected time. The ballistic deployment processor can also include a space vehicle subprocessor configured to equip a space vehicle with the dust, a launch subprocessor configured to launch the space vehicle to arrive at the forward edge location before the pre-selected time, and a release subprocessor configured to release the dust at the forward edge location at the pre-selected time to engulf the orbital debris as the orbital debris passes through the dust cloud. The satellite deployment processor can include, but is not limited to including, an orbit subprocessor for determining an orbit altitude band of the orbital debris of the spatial extent, a satellite selection subprocessor for selecting at least one satellite, the at least one satellite counter-orbiting with respect to the debris orbit, and a satellite configuration processor for configuring the at least one satellite with the dust, and for configuring the at least one satellite to release the dust in the orbit altitude band at the higher altitude edge of the orbital debris, the dust being released in a direction counter-rotating in relation to at least a portion of a distributed band of the orbital debris. The system can further include subprocessor for selecting the dust based on dust properties, the dust properties at least minimizing adverse effects on active satellites, the dust properties causing a natural rate of decay of the orbit altitude of the dust to be roughly synchronized with a rate of artificial decay of the orbital debris, for determining an amount of the dust based on the spatial extent of a dust cloud of the dust, the position of the orbital debris, and the amount of time of the interaction of the cloud with the orbital debris, for determining the lifetime of the dust based on the dust properties, characteristics of the dust cloud, and solar radiation pressure on dust cloud, for adjusting the density of the dust to effect a subset of the orbital debris, for example, but not limited to, a subset having a pre-selected ballistic coefficient range, and for lowering the altitude of the orbital debris to a pre-selected altitude, the pre-selected altitude being sufficient to deorbit the orbital debris based on the Earth's natural drag in the desired time.

For example, small objects with a ballistic coefficient $(mass(kg)/area(m^2))$ of three or less can be evaluated. A ballistic coefficient of three represents small objects in a variety of sizes and shapes, for example, broken pieces of satellites, for example, but not limited to, aluminum having a density 2.7 gm/cc and with 10 cm×10 cm surface area exposed to the drag force. Objects with lower density, for example, but not limited to, plastic having a density of 1 gm/cc can be larger in dimension. The dust density necessary to de-orbit small objects can be sufficiently low such that the orbits of larger active satellites with much larger ballistic coefficients can be minimally affected. The size and material of dust grains can be optimized to obtain the desired dust layer lifetime in orbit and to minimize impact damage to active satellites.

Exemplary analysis using circular orbits indicates that objects with ballistic coefficient of three or less can be de-orbited from 1100 km to 900 km in twenty-five years using, for example, but not limited to, twelve tons of tungsten dust of about 10-30 μm diameter. A larger quantity of dust may be used, for example, for a larger altitude reduction or when the orbital debris has a relatively large ballistic coefficient.

DETAILED DESCRIPTION

The problems set forth above as well as further and other problems are solved by the present teachings. These solutions and other advantages are achieved by the various embodiments of the teachings described herein below.

The altitude of objects, referred to herein as orbital debris, can be reduced to below 900 km by artificially increasing the drag on the objects. Higher drag can be achieved by dust grains in a similar but oppositely directed orbit with respect to the targeted objects. Due to orbit perturbations caused by the Earth's irregular gravitational field, the dust as well as objects' orbits can precess and intersect with different objects at both head-on and grazing angles. As result of precession and some spread in velocity the dust grains injected in quasi-circular orbits ultimately form an azimuthal shell or a partial shell.

Figure 1:
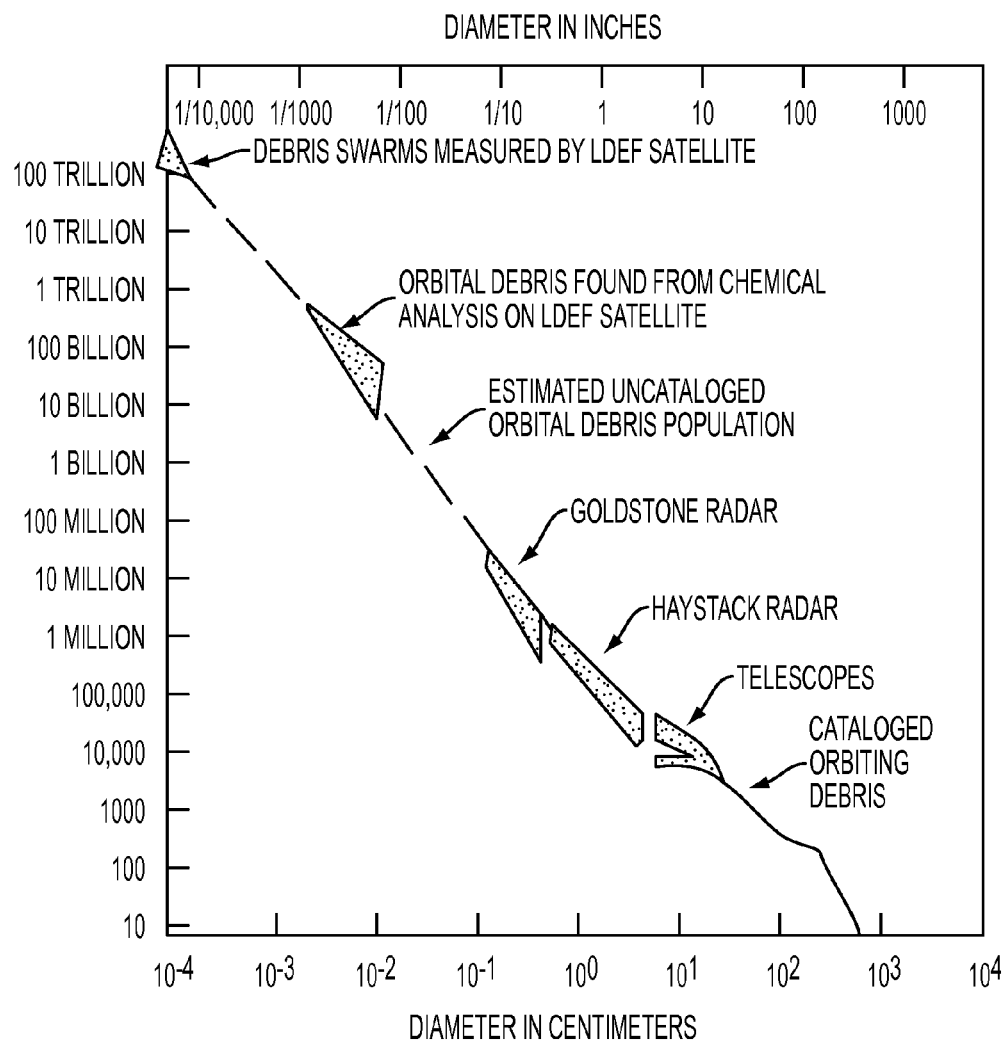
FIG. 1 is a graphical representation of the number of orbital debris objects found within 1600 km of the Earth's surface.
Figure 2A:
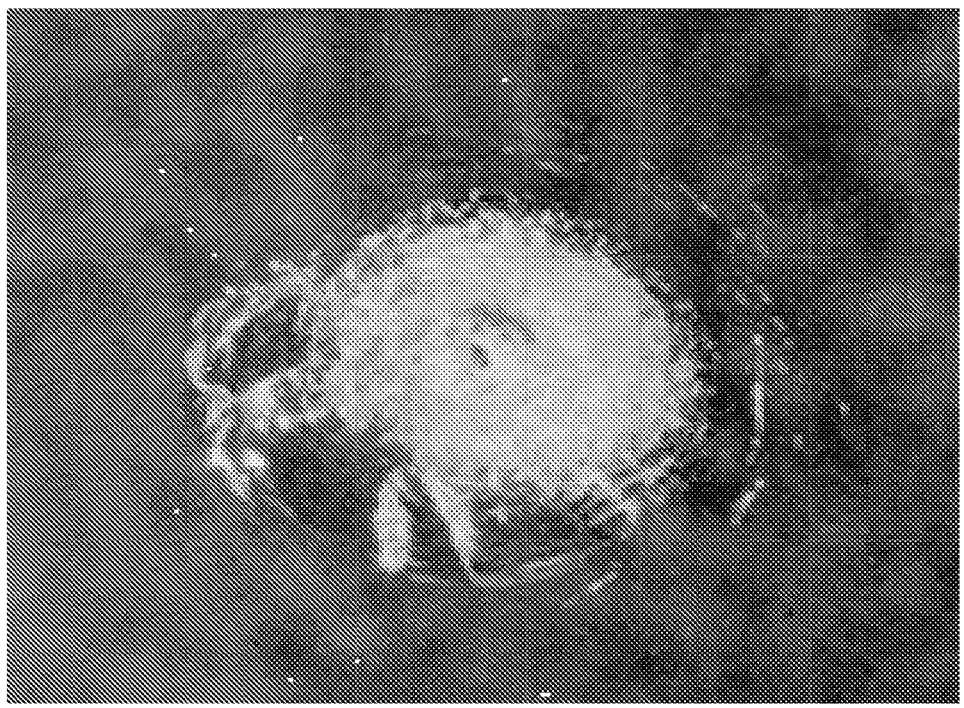
FIG. 2A is a pictorial representation of a 4 mm diameter crater on the windshield of the space shuttle created by the impact of a 0.2 mm paint chip.
Figure 2B:
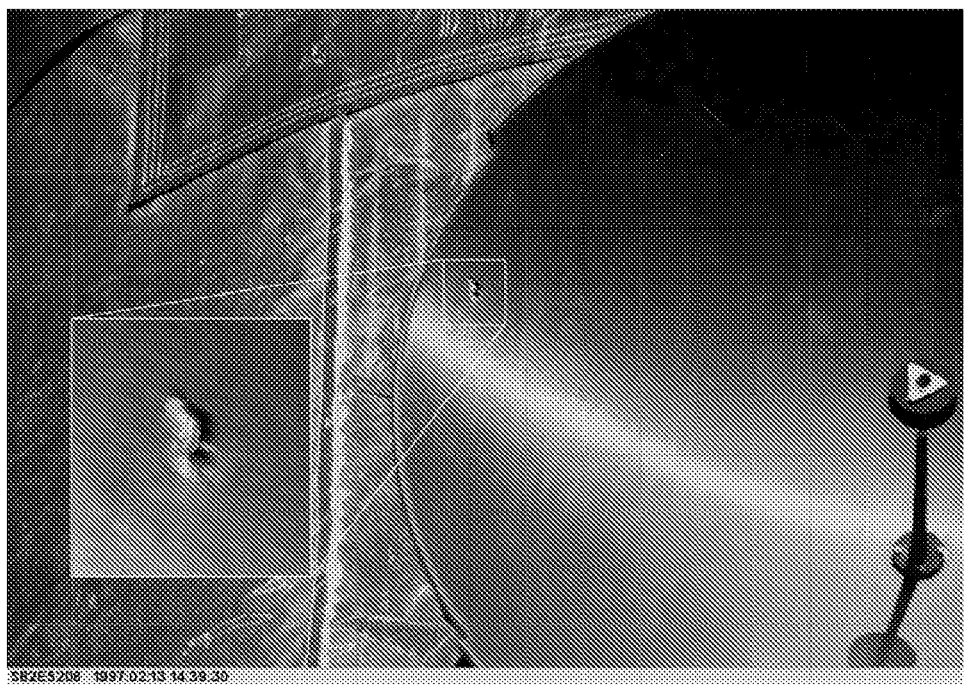
FIG. 2B is a pictorial representation that the impact of a <1 cm piece of orbital debris created a hole on an antenna of the Hubble space telescope.
Figure 3A:
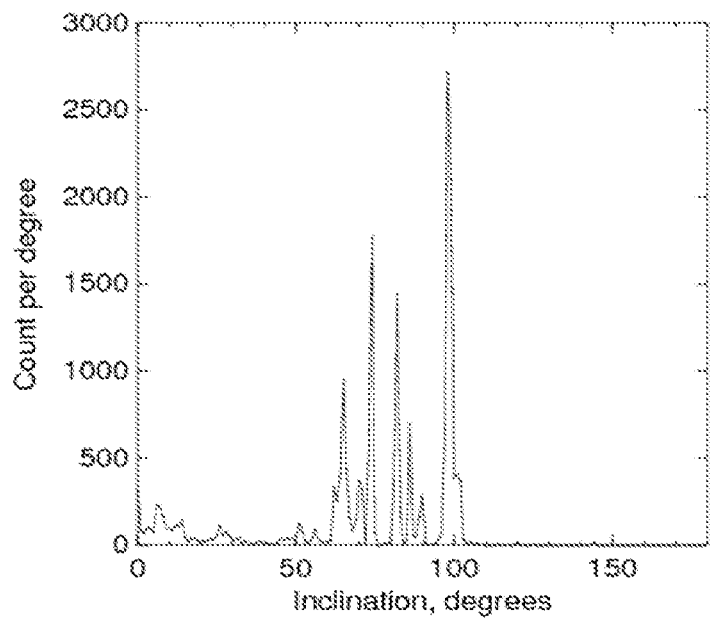
FIG. 3A is a graphical representation of the debris distribution in inclination angles.
Figure 3B:
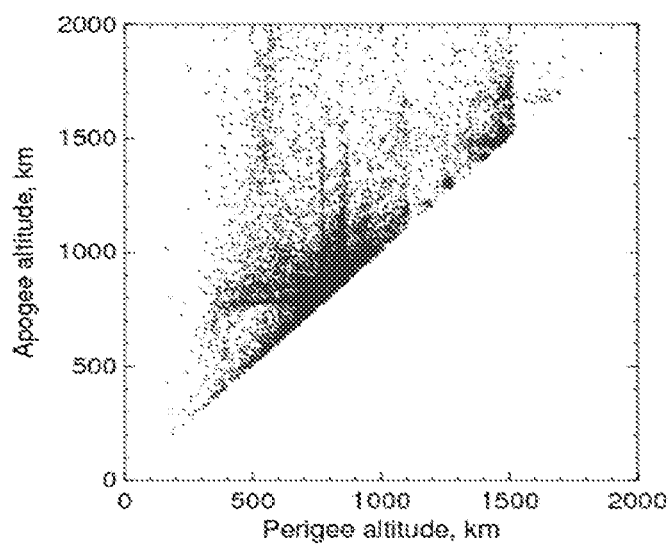
FIG. 3B is a graphical representation of showing that most of the objects in the sun synchronous orbits have nearly circular orbits.
Figure 4:
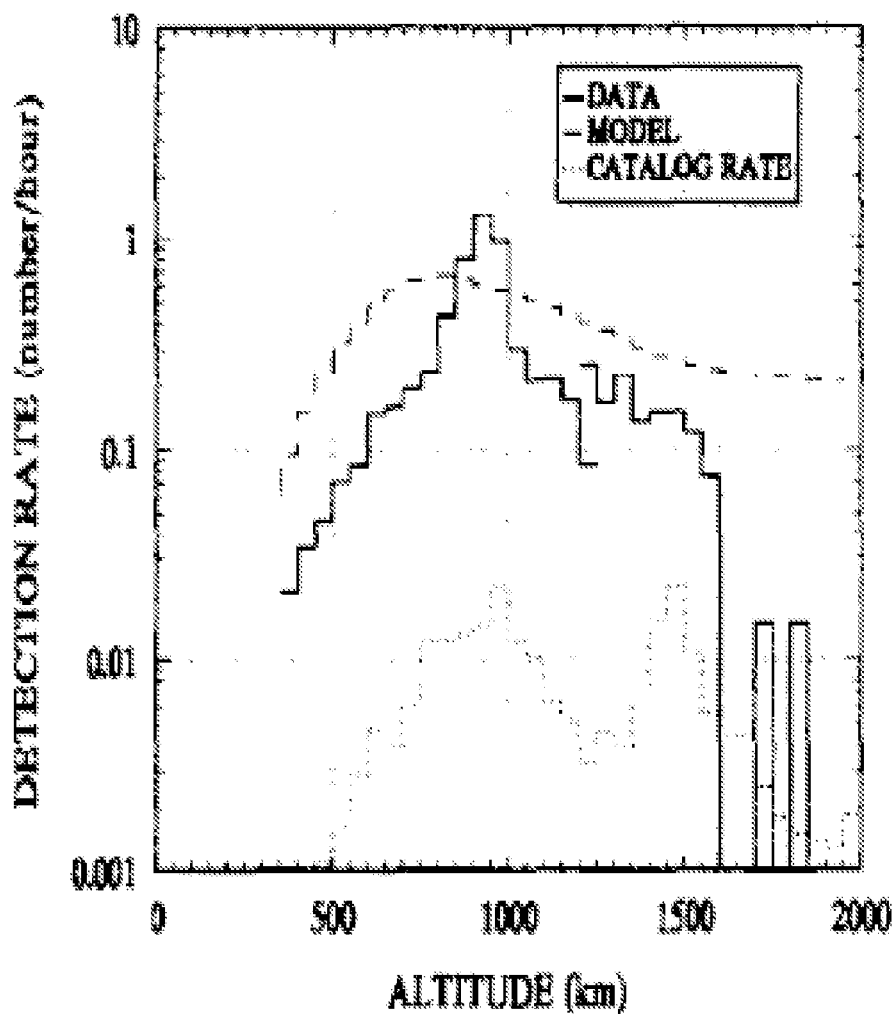
FIG. 4 is a graphical representation of statistical tracking of small objects.
Figure 5:
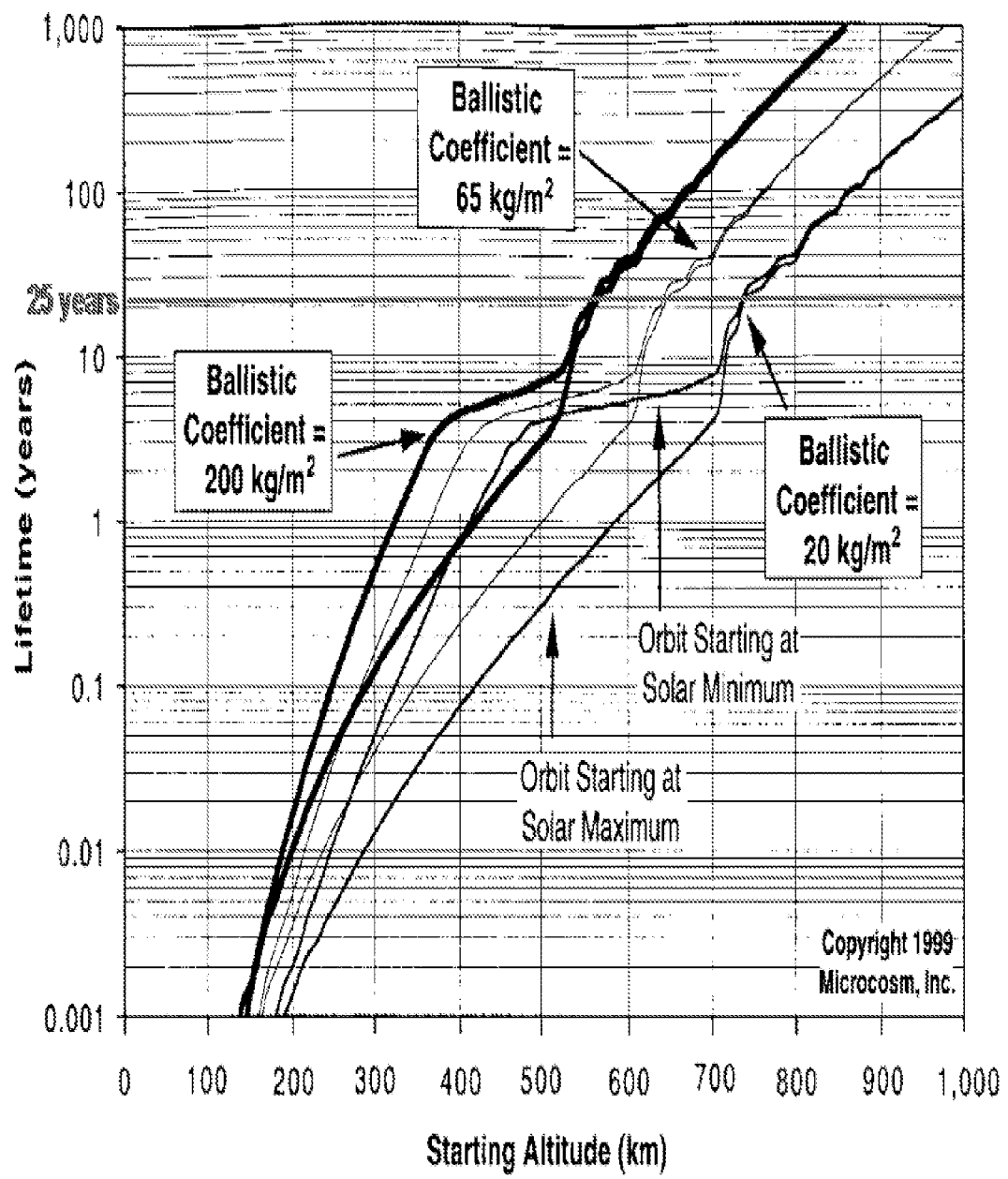
FIG. 5 is a graphical representation of the lifetimes of objects as a function of their ballistic coefficients.
Figure 6A:
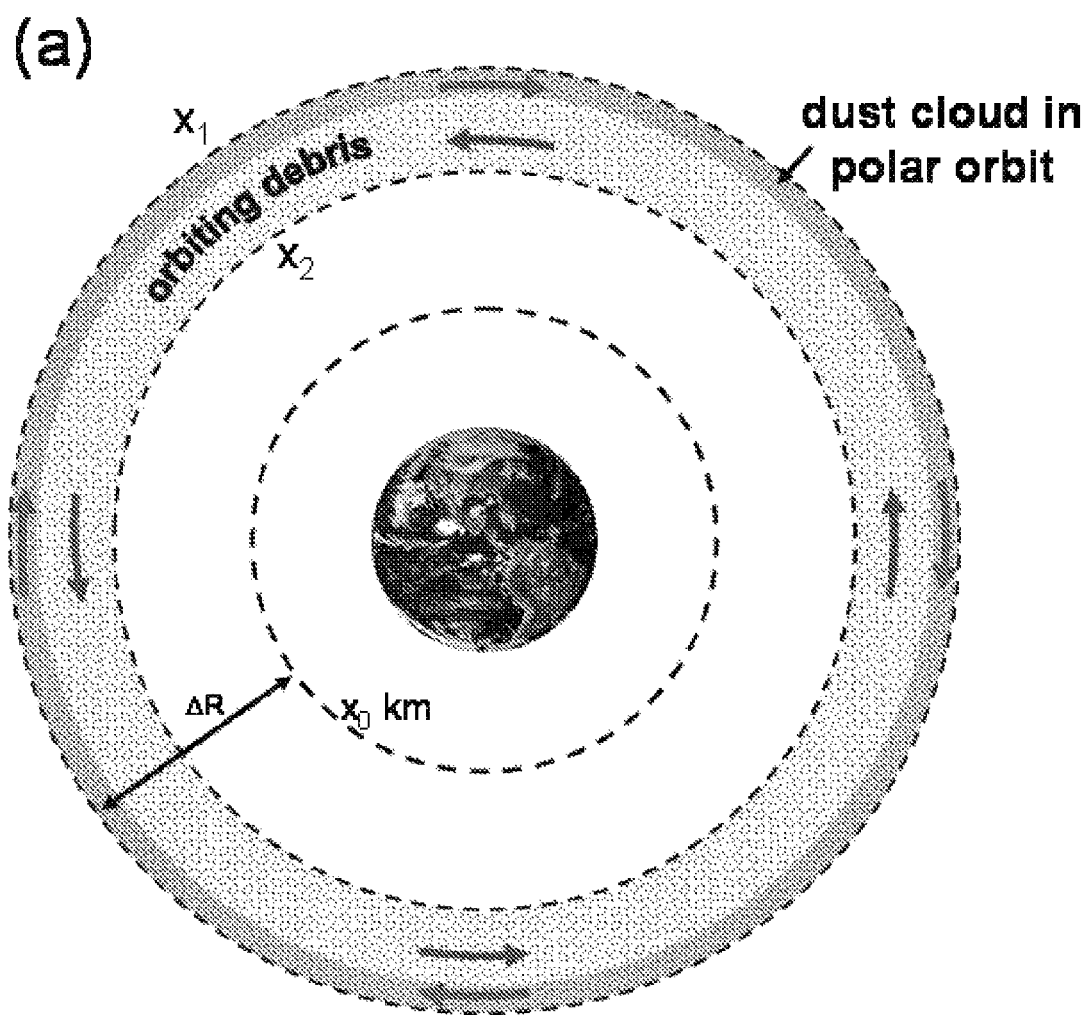
FIGS. 6A-6C are diagrams illustrating the ballistic method of deployment.
Figure 6B:
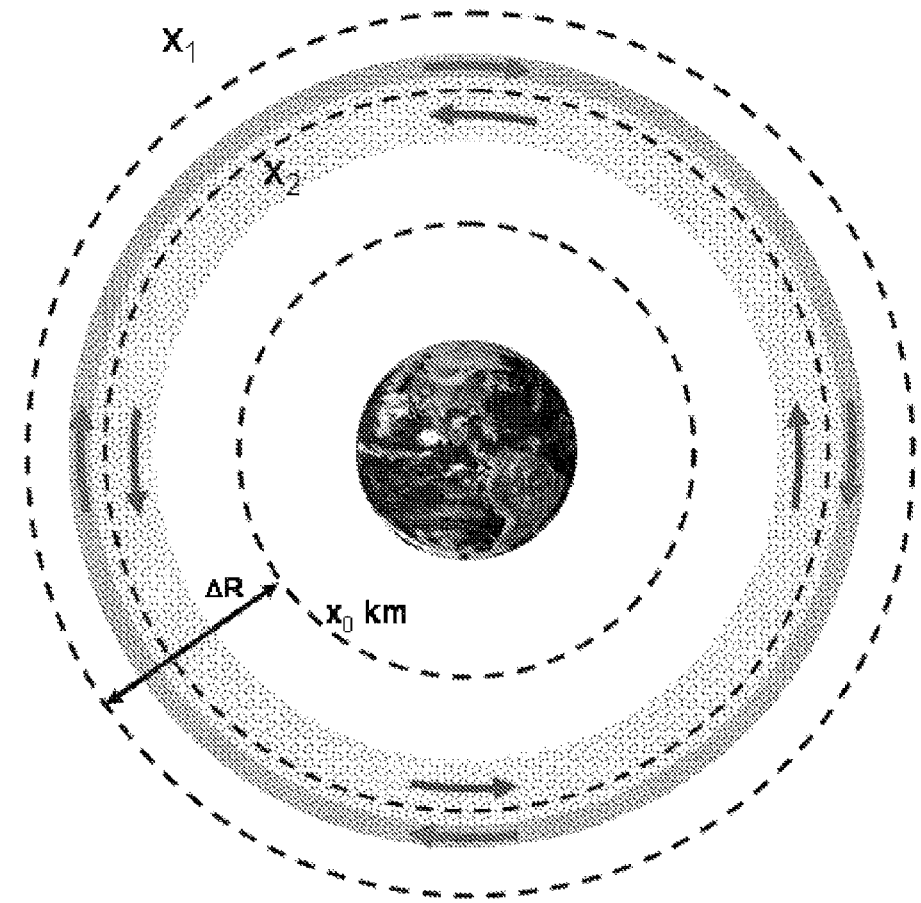
Figure 6C:
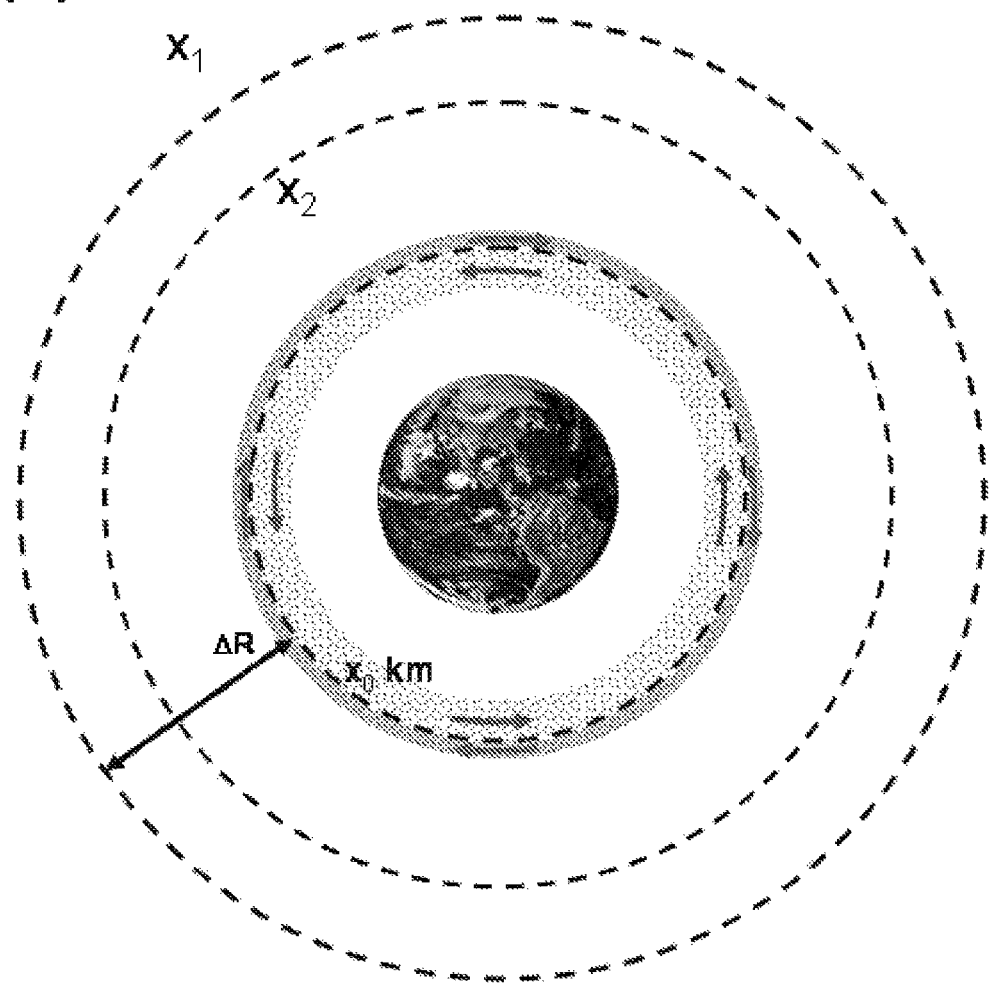
Figure 7A:
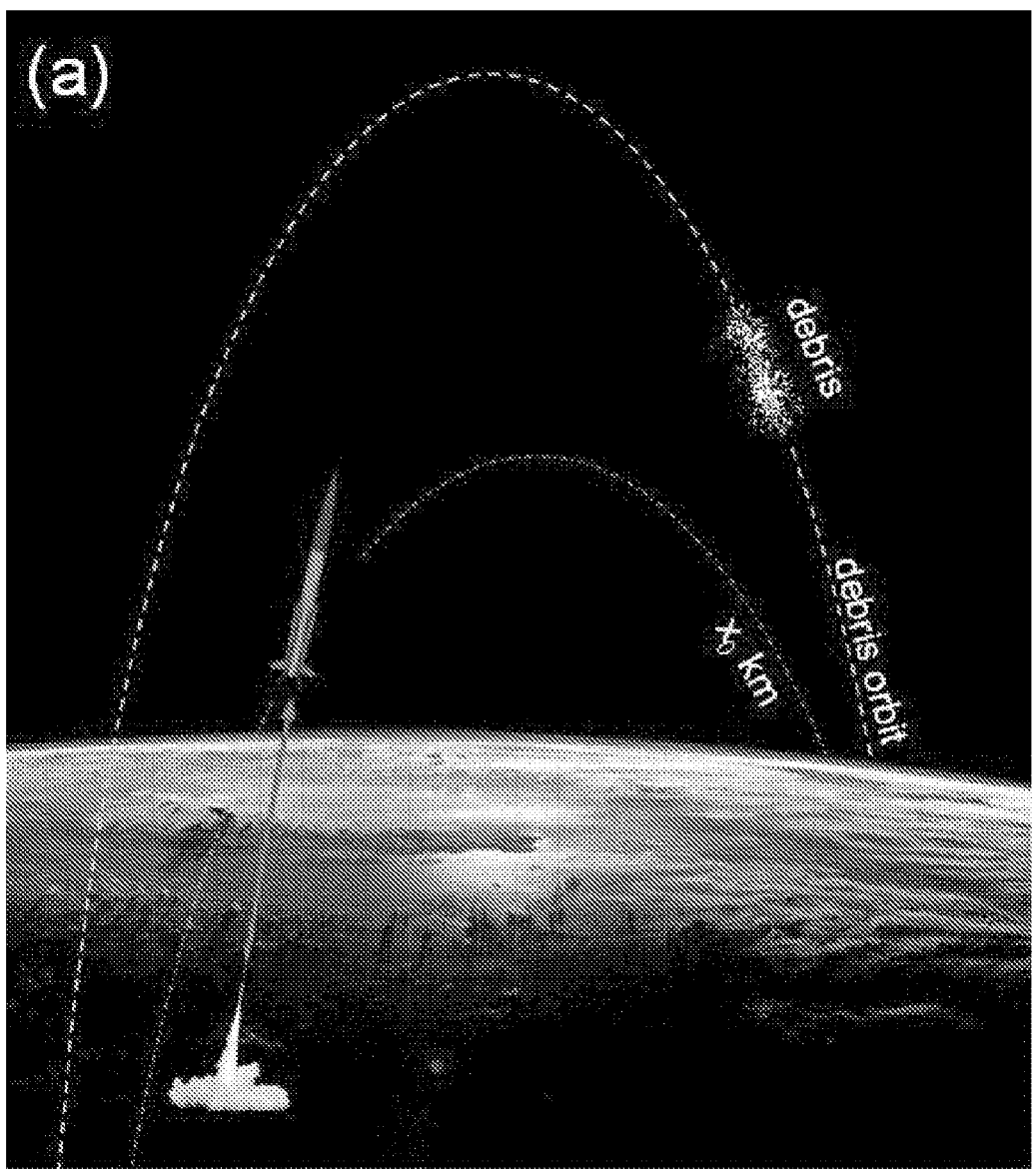
FIGS. 7A-7C are diagrams illustrating the satellite method of deployment.
Figure 7B:
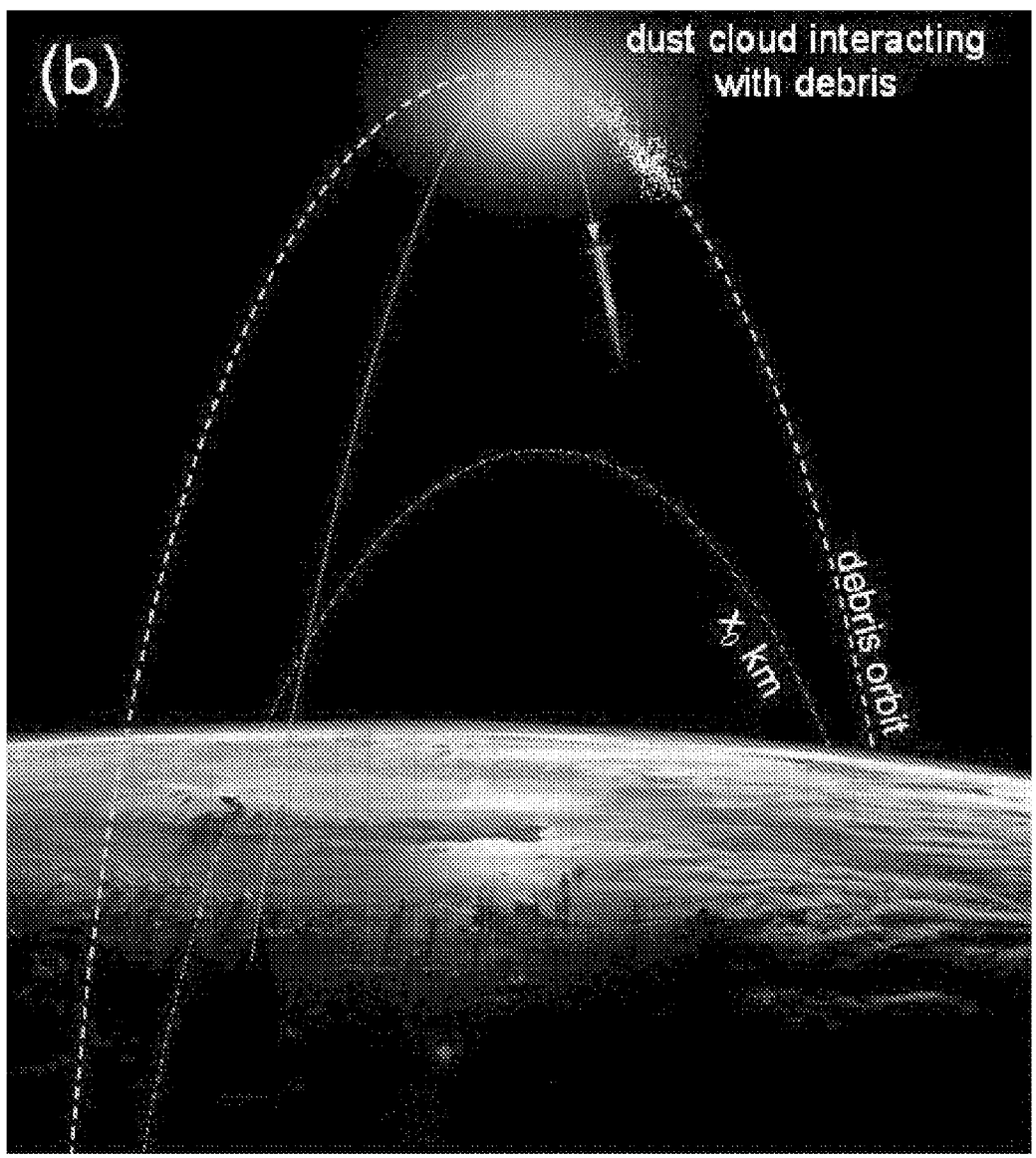
Figure 7C:
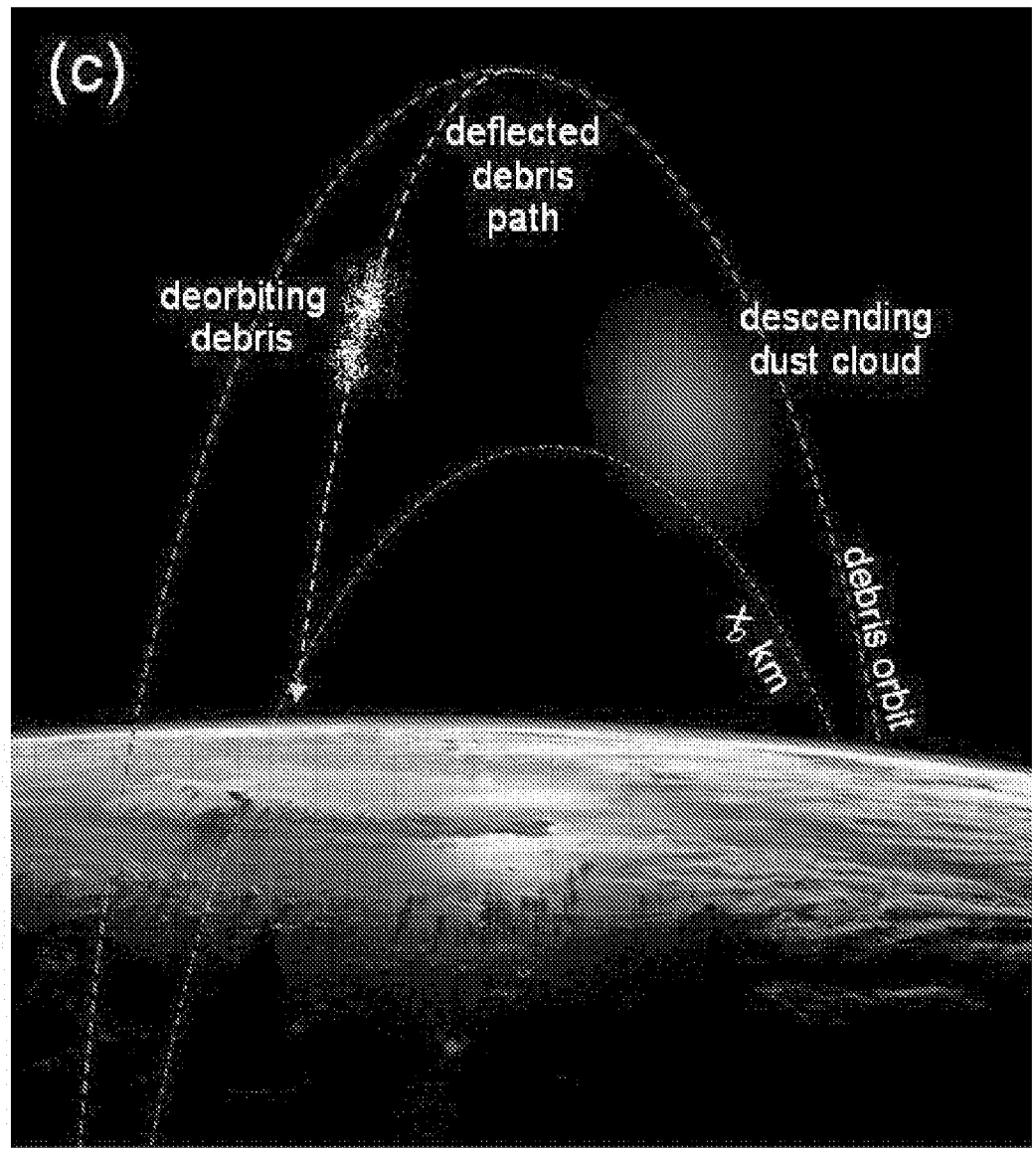

Referring now to FIGS. 6A-6C and FIGS. 7A-7C, satellite method 250 (FIG. 9B) and ballistic method 350 (FIG. 9C) are pictorially illustrated. FIGS. 6A-6C illustrate a dust cloud in a polar orbit counter-rotating with respect to the debris. FIG. 6A illustrates a targeted debris population located in a shell between altitudes X1 and X2 (shaded). In the drawing, a torroidal dust cloud of thickness δR is deployed in polar orbit at the upper edge of the debris band (darker shades). FIG. 6B illustrates that half of the debris population is counter-rotating with respect to the dust. This leads to enhanced drag on the debris resulting in loss of debris altitude. The dust orbit also descends under Earth's natural drag. Dust sweeps the debris population with it and leads to a dust "snow plow" effect. FIG. 6C illustrates that the descents of the dust cloud and the debris population can be synchronized. Both dust and debris descend to an altitude of x0 km below which Earth's natural drag is sufficient to force reentry within a desired time. FIGS. 7A-7C illustrate orbital debris intersecting with ballistically injected dust and being de-orbited.

The drag on the objects' orbit is determined by, $$\underbrace{\left(\frac{M}{A^2}\right)}_{\substack{Ballistic \\ Coefficient}} \frac{dV}{dt} = -\underbrace{n_d m_d}_{Dust} \times \underbrace{(V-v_d)^2}_{\substack{Relative \\ Velocity}} \times \kappa - \underbrace{n_0 m_0}_{Atmosphere} V^2, \quad (1)$$

where M, A, V, are debris mass, representative linear dimension, and velocity, while $m_d$, $v_d$, and $n_d$, are the mass, velocity, and density of dust. For circular orbits the change in velocity and altitude is related by $\Delta R = 2R(\Delta V/V)$. The factor $\kappa=(1+\sqrt{1+f})$ in Eq. (1) accounts for the type of dust/objects collision. If f=−1 then it implies that the dust is stuck on the objects on impact i.e., inelastic collision, f=0 implies elastic collision, and f>0 implies loss of debris mass due to evaporation or melting resulting from hypervelocity impacts. The natural atmospheric drag is included in Eq. (1) through atmospheric density $n_0$ and mass $m_0$. By considering a thin layer of dust of width $\delta R$, Eq. (1) indicates that the total dust mass $M_d$ necessary to reduce the objects' height from its location at R by $\Delta R$ is, $$M_d \sim B \frac{2\pi R^2 \delta R}{\kappa (V-v_d)^2} \frac{dR}{dt} \quad (2)$$

where dR/dt is the rate of debris descent. The dust mass necessary to clear small debris with B<3 located in a spherical shell of width $\delta R=50$ km at an altitude 1100 km, i.e., R≈7500 km with volume $4\pi R^2 \delta R = 3.5 \times 10^9$ km$^3$ in 25 years is three tons for $\kappa=4.3$. Maximum drag is achieved when the relative velocity between dust and the objects, $v_{rel}=V-v_d=2V$ where V≈7.5 km/s. This implies hypervelocity dust-object collision at 15 km/s which can result in object evaporation and increase in drag force by a factor $\kappa=(1+\sqrt{1+f})$, where $fm_d$ is the object mass that can evaporate at hypervelocity impact with dust grain. For example, if the object is aluminum with heat of vaporization of 11 KJ/g, dust grains moving at 15 km/s correspond to 110 KJ/g specific kinetic energy. Due to the shock generated at hypervelocity impact, dust kinetic energy will be used to vaporize objects, and object mass of about $10\,m_d$ can evaporate upon impact. This corresponds to f=10 and hence $\kappa=(1+\sqrt{1+f})=4.3$. This value of $\kappa$ may be conservative because the heat of vaporization of aluminum used corresponds to normal atmospheric pressure. Hypervelocity impact may generate much higher pressure locally which will lower the heat of vaporization leading to much larger object matter vaporization. Also the heat of melting is lower, implying that a portion of the object will melt and lose more mass than is estimated from vaporization. This will result in larger $\kappa$ which implies lower dust mass. Then Eq. (2) indicates that the total dust mass $M_d$ necessary to reduce the object height from its location at R by $\Delta R=200$ km by a dust "snow plow" effect where the rate of descent of dust layer and the debris is roughly synchronized and is approximately twelve tons in twenty-five years.

The length of time required to de-orbit the small objects can be limited by a number of factors. The lifetime of silicon and tungsten dust of a variety of sizes from 1-100 μm can be calculated because the lifetime of the dust is proportional to its size. The on/off radiation pressure due to dust orbit in sunlight and in earth shadow can introduce a spatial spread perpendicular to its Keplerian orbit. Preliminary estimates suggest that 30 μm or smaller tungsten dust can be suitable for small debris de-orbit. The lifetime of 30 μm diameter tungsten dust grains released at an altitude of 1100 km with inclination of 80-90 degrees is about 15 years.

Based on the physics discussed above, dust can be released in quasi-circular orbits between 900 km and 1100 km. The mass of the dust can be based on the ballistic coefficient of the objects targeted for removal. The dimensions of the dust grains can be optimized so that they are small enough to be harmless to active satellites on impact. Also, the density of the dust grains can be optimized to be sufficient to de-orbit the low ballistic coefficient objects without materially affecting the orbits of active satellites with larger ballistic coefficient. The period of induced drag on targeted small objects can be designed to be long (20-25 years) so that the requirement for the total dust mass can be low. Since typical lifetime of low earth orbiting satellites is about 5-7 years and their ballistic coefficient is much larger, perturbation to their orbits by the dust during this period may be negligible. Dust cloud can be released in the form of a torus or a partial torus in the polar orbit. Because of precession the debris orbits will intersect with the dust torus. In a series of releases in quasi-circular orbits with different inclinations around 90 degrees, the dust cloud can be spread and form an azimuthal shell or a partial shell with large meridianal velocity in both directions. At any given point in this shell, half of the dust mass can be in orbit oppositely directed to the targeted object population. The interaction of dust with objects in this shell can lower the objects' altitude. The dust layer itself can descend in altitude over time and in the process can lower the altitude of the objects from 1100 km to 900 km by a "snow plow" effect below which the lifetime of the small objects is naturally 25 years. Along with the objects, the injected dust can ultimately burn up in the earth's atmosphere at lower altitudes. The dust may be delivered as a secondary payload utilizing the excess capacity in many launches or as a separate dedicated dust dispensing satellite.

Since solar arrays returned to earth after years of exposure to the LEO debris environment on the Hubble Space Telescope have shown the ability to continue to function without impact attributed power loss despite 2,700 impact sites in the 100 micron and above size range, adverse effects of less than 30 μm dust size to be used for debris removal may be minimal. Hypervelocity impact of the injected dust with other sensors of active satellites can occur if the sensors point in the direction of the satellite motion, but normally, earth observation satellites point sensors earthward and scientific satellites point sensors away from earth, both directions being nearly orthogonal to the satellite motion. Hence, the risk to active satellite missions associated with the small objects removal technique of the present teachings is minimized. However, these issues can be circumvented by maneuvering the active satellites around the dust layer of a limited thickness (~30-50 km). Active spacecraft could be maneuvered above or below this band using onboard propulsion and avoid the artificial dust flux altogether. The delta V required for a 50 km orbit raise is only 44 m/s. For a satellite such as DMSP which masses about 825 kg, a 44 m/s orbit raise (plus the slight inclination change needed to maintain sun synchronicity) would require about 16 kg of hydrazine propellant.

To deploy the dust, canisters can be mass produced and delivered to orbit with any excess capability on, for example, but not limited to, an Evolved Expendable Launch Vehicle (EELV) going into polar orbit. If there are two EELV's (or equivalent) with excess capability launched in polar orbit per year, and if 150 kg of the 181 kg capacity of each EELV Secondary Payload Adapter (ESPA) ring port can be dust mass, and if all six ports on an ESPA ring on each of the two assumed polar orbit launches per year are used, about 900 kg (roughly a ton) of dust could be carried per launch. In five years, approximately 10 tons of dust could be delivered to polar orbit and in ten years, approximately twenty tons.

Figure 8A:
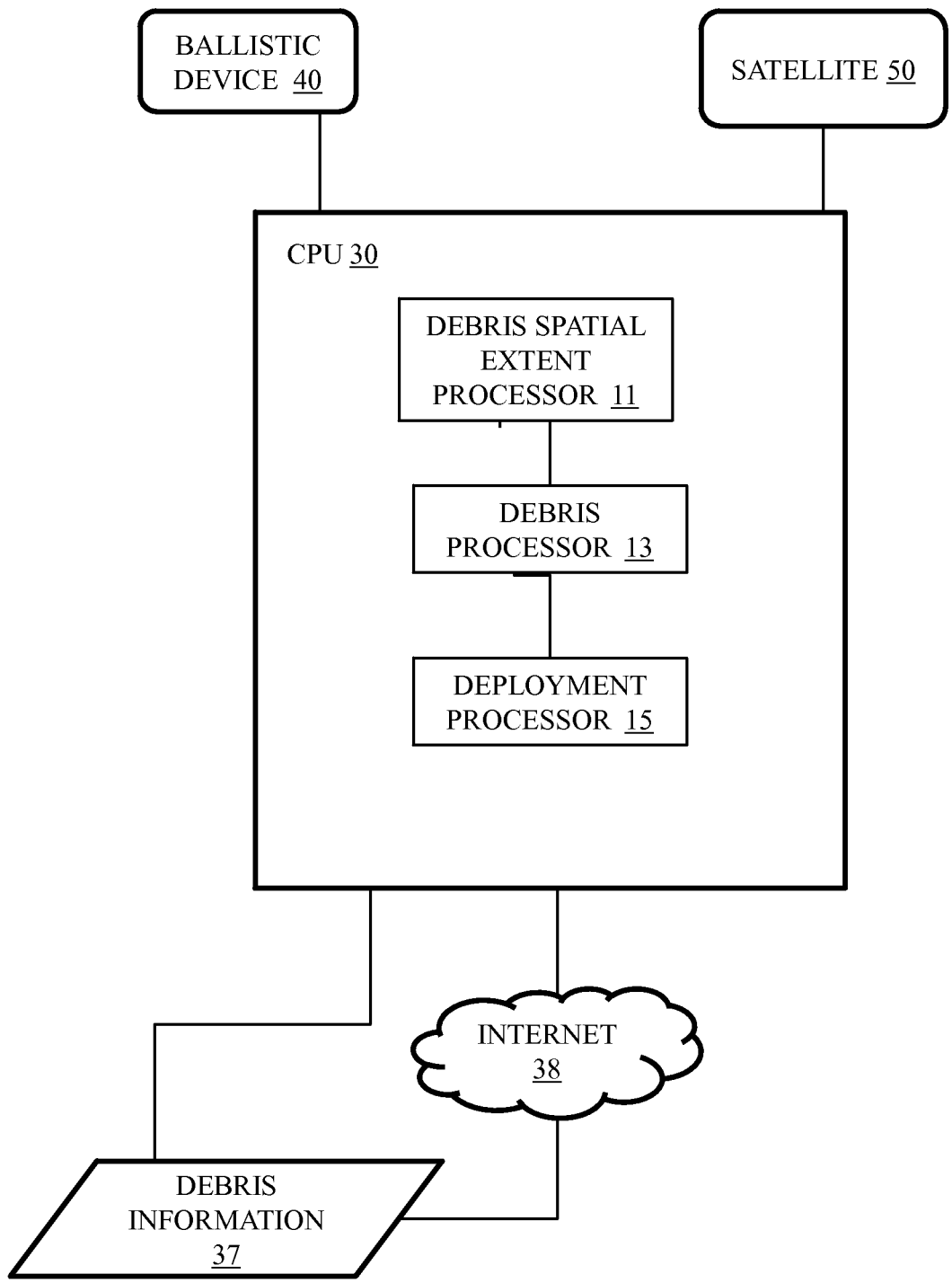
FIGS. 8A and 8B are schematic block diagrams of the system for inducing rapid reentry of orbital debris.
Figure 8B:
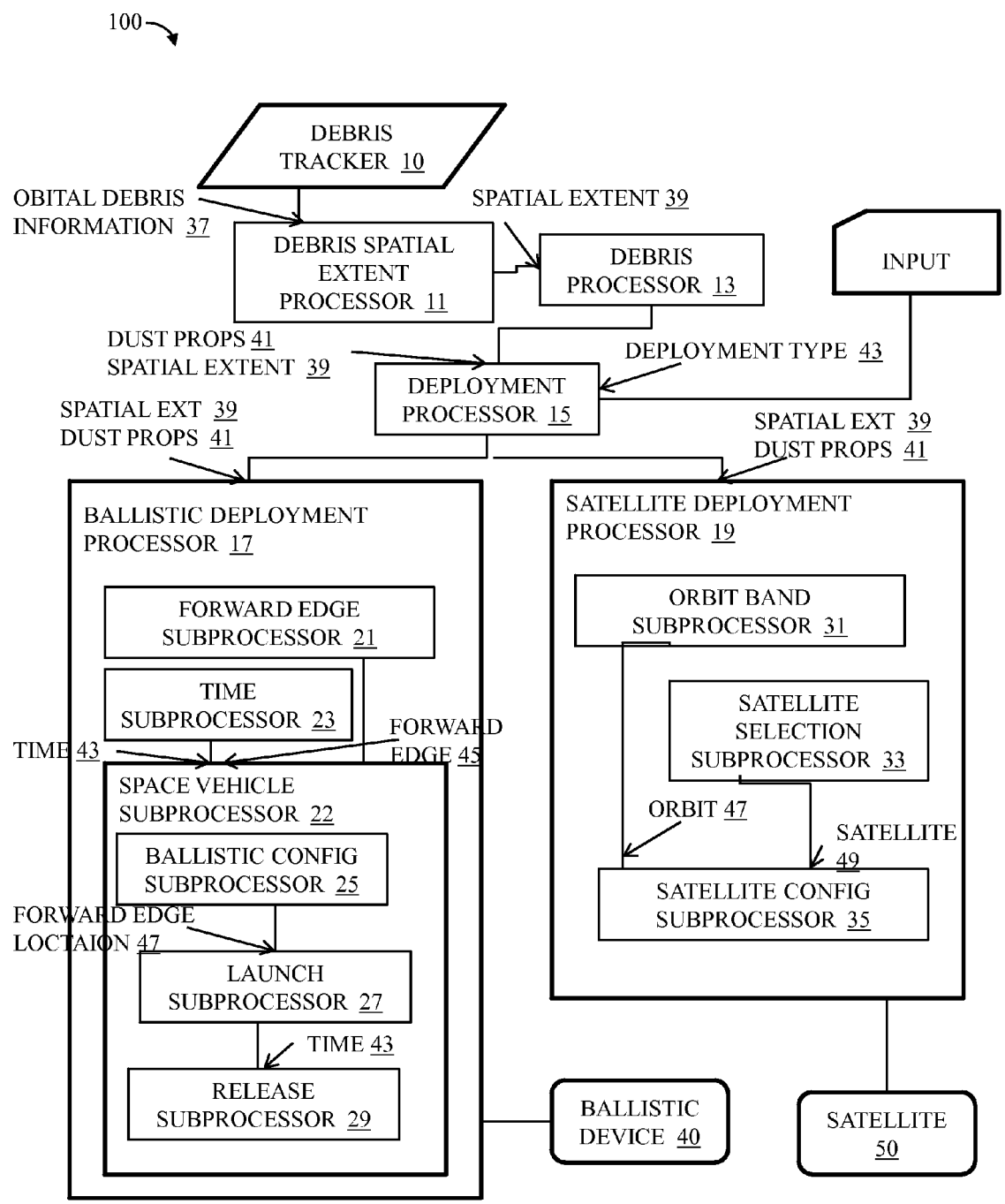

Referring now to FIGS. 8A and 8B, system 100 for inducing rapid reentry of orbital debris can include, but is not limited to including, debris location processor 11 receiving, from debris tracker 10, orbital debris information 37, and determining spatial extent 39 of the orbital debris. System 100 can further include debris processor 13 configured to receive spatial extent 39 from debris location processor 11, and determine dust properties 41 of the orbital debris of spatial extent 39. System 100 can further include deployment processor 15 for deploying dust having dust properties 41 to the orbital debris having spatial extent 39 to artificially enhance the drag on the orbital debris having spatial extent 39. Deployment processor 15 can receive deployment type 43 to direct deployment processor 15 to choose between, for example, but not limited to, ballistic deployment processor 17 or satellite deployment processor 19. Ballistic deployment processor 17 can include, but is not limited to including, forward edge subprocessor 21 for determining forward edge 45 of the orbital debris, and time processor 23 for determining forward edge location 47 of forward edge 45 at a pre-selected time 43. Ballistic deployment processor 17 can also include space vehicle subprocessor 22 configured to equip a space vehicle with the dust, launch subprocessor 27 configured to launch the space vehicle to arrive at forward edge location 47 before pre-selected time 43, and release subprocessor 29 configured to release the dust at forward edge location 47 at pre-selected time 43 to engulf the orbital debris as the orbital debris passes through the dust. Satellite deployment processor 19 can include, but is not limited to including, orbit subprocessor 31 for determining an orbit altitude band of the orbital debris of spatial extent 39, satellite selection subprocessor 33 for selecting at least one satellite 49 that is counter-orbiting with respect to the debris orbit, and satellite configuration processor 35 for configuring at least one satellite 49 with the dust, and for configuring at least one satellite 49 to release the dust in the debris orbit at the higher altitude edge of the orbital debris, the dust being released in a counter-rotating orbit relative to the debris orbit. The system can further include subprocessors for selecting the dust based on dust properties 41, where dust properties 41 at least minimize adverse effects on active satellites, and where dust properties 41 can cause a natural rate of decay of the orbit altitude of the dust to be roughly synchronized with a rate of artificial decay of the orbital debris, for determining an amount of the dust based on the spatial extent of a dust cloud of the dust, the position of the orbital debris, and the amount of time of the interaction of the cloud with the orbital debris, for determining the lifetime of the dust based on dust properties 41, characteristics of the dust cloud, and solar radiation pressure associated with the dust cloud, for adjusting the density of the dust to effect a subset of the orbital debris, for example, a subset having a pre-selected ballistic coefficient range, and for lowering the altitude of the orbital debris to a pre-selected altitude, the pre-selected altitude being sufficient to deorbit the orbital debris based on the Earth's natural drag in the desired time.

Figure 9A:
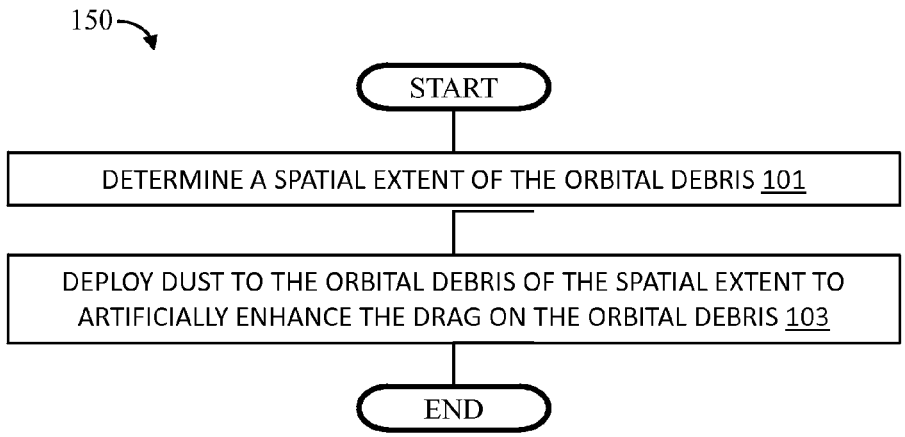
FIGS. 9A-9C are flowcharts of the methods for inducing rapid reentry of orbital debris of the present teachings.
Figure 9B:
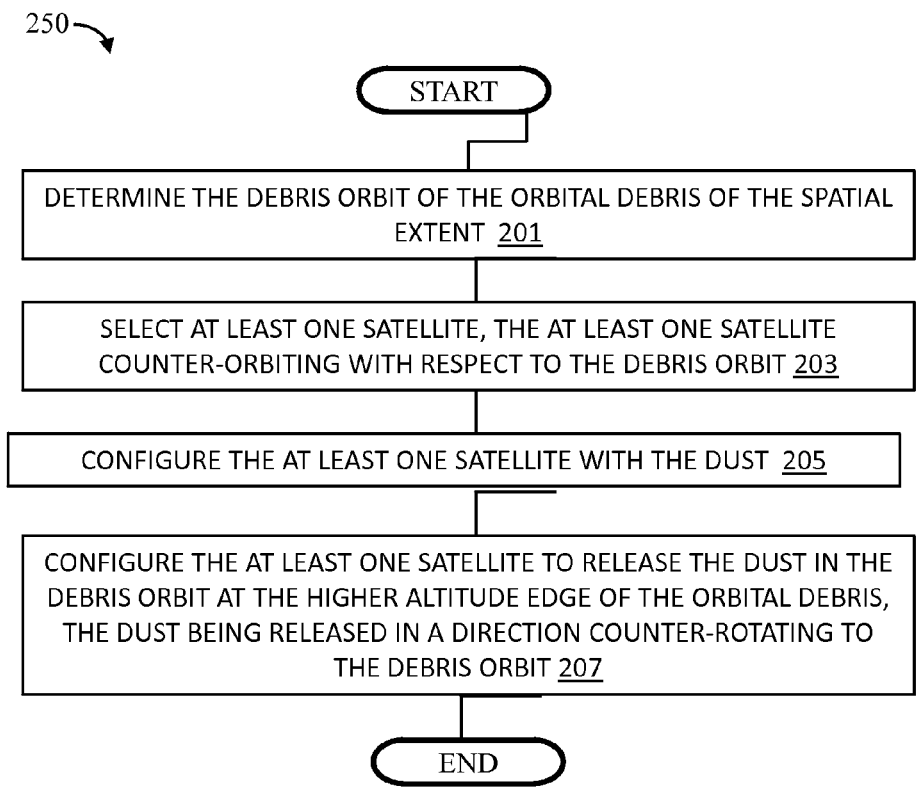
Figure 9C:
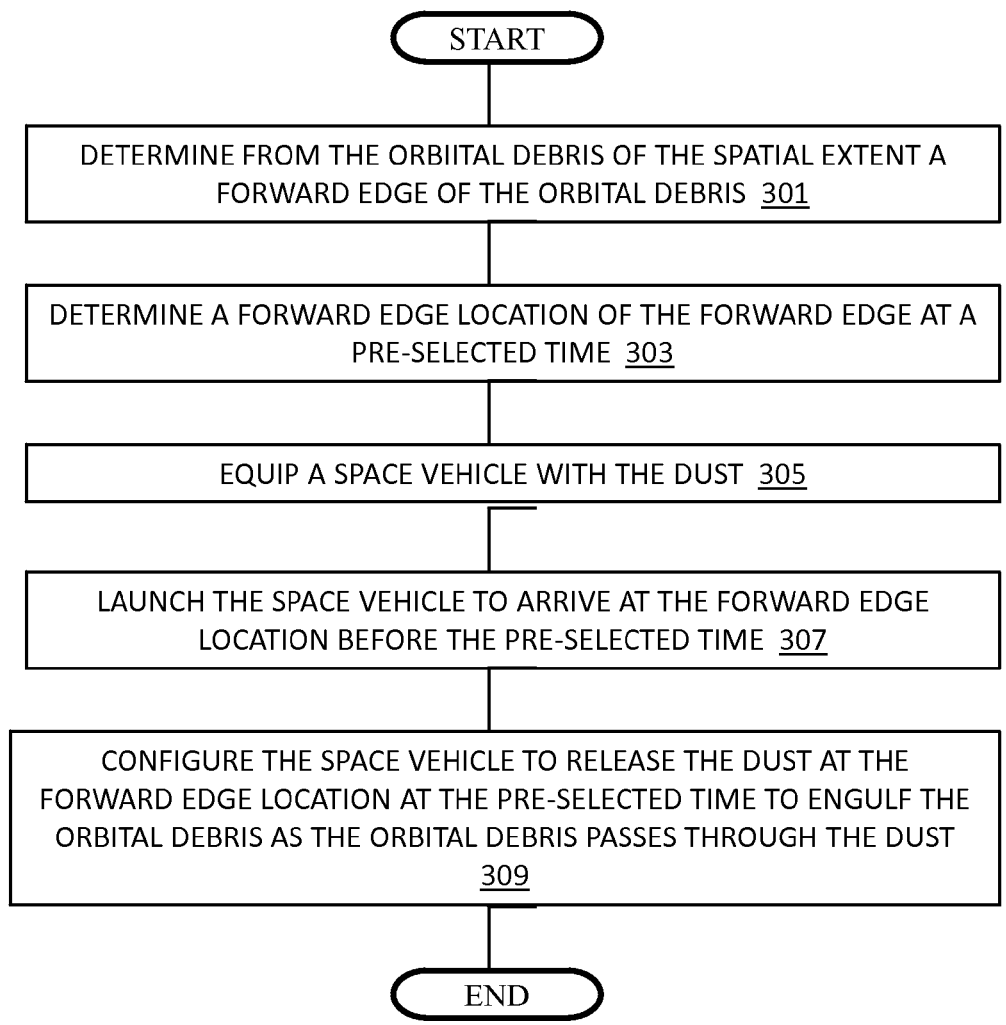

Referring now primarily to FIGS. 9A-9C, method 150 for inducing rapid reentry of orbital debris can include, but is not limited to including, the steps of determining 101 spatial extent 39 (FIG. 8B) of the orbital debris, and deploying 103 dust to the orbital debris of spatial extent 39 (FIG. 8B) to artificially enhance the drag on the orbital debris. There are at least two methods to deploy the dust, satellite method 250 and ballistic method 350. Satellite method 250 of deploying dust can include, but is not limited to including, the steps of determining 201 an orbit altitude band of the orbital debris of spatial extent 39 (FIG. 8B), selecting 203 a satellite that is in a counter-orbit with respect to the orbit of the orbital debris, configuring 205 the satellite to include the dust, and configuring 207 the satellite to release the dust into the orbit altitude band at the higher altitude edge of the orbital debris, the dust being released in a direction counter-rotating in relation to at least a portion of a distributed band of the orbital debris orbit (see FIGS. 6A-6C). Ballistic method 350 of deploying can include, but is not limited to including, the steps of determining 301 from spatial extent 39 (FIG. 8B) forward edge 45 (FIG. 8B) of the orbital debris, determining 303 forward edge location 47 (FIG. 8B) of forward edge 45 (FIG. 8B) at pre-selected time 43 (FIG. 8B), equipping 305 a space vehicle with the dust, launching 307 the space vehicle to arrive at forward edge location 47 (FIG. 8B) before pre-selected time 43 (FIG. 8B), and configuring 309 the space vehicle to release the dust at forward edge location 47 (FIG. 8B) at pre-selected time 43 (FIG. 8B) to engulf the orbital debris as the orbital debris passes through the dust. Either satellite method 250 or ballistic method 350 can further include the steps of selecting the dust based on dust properties 41 (FIG. 8B), so that the dust at least minimizes adverse effects on satellites, determining an amount of the dust based on the spatial extent of a cloud of the dust, the position of the orbital debris, and the amount of time of the interaction of the cloud with the orbital debris based on dust properties 41 (FIG. 8B), characteristics of the dust cloud, adjusting the density of the dust to effect a subset of the orbital debris, for example, the subset having a pre-selected ballistic coefficient range, and lowering the altitude of the orbital debris to a pre-selected altitude, the pre-selected altitude being sufficient to deorbit the orbital debris based on the Earth's natural drag in the desired time. Satellite method 250 can further include the steps of selecting the dust based on dust properties, the dust properties being configured to cause a natural rate of decay of the orbit altitude of the dust to be roughly synchronized with a rate of artificial decay of the orbital debris, and determining the lifetime of the dust based on solar radiation pressure on the dust cloud.

The present embodiment is also directed to a system and methods that can be executed in hardware, firmware, and/or software for accomplishing the methods discussed herein, and, possibly, computer readable media storing software for accomplishing these methods and system. The various modules described herein can be provided in conjunction with a single CPU, or on an arbitrary number of different CPUs. Other alternative computer platforms can be used. The operating system can be, for example, but is not limited to, WINDOWS® or LINUX®. Communications links can be wired or wireless, for example, using cellular communication systems, military communications systems, and satellite communications systems. Any data and results can be stored for future retrieval and processing, printed, displayed, transferred to another computer, and/or transferred elsewhere.

In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again to FIGS. 9A-9C, methods 150, 250, and 350 can be, in whole or in part, implemented electronically. Signals representing actions taken by elements of system 100 and other disclosed embodiments can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read.

Although the present teachings have been described with respect to various embodiments, it should be realized these teachings are also capable of a wide variety of further and other embodiments.

What is claimed is:

1. A method for inducing rapid reentry of a distribution of orbital debris scattered over a large volume comprising:
   determining a forward edge location of the distribution of orbital debris; and
   intentionally deploying, from a spacecraft, a specific kind of dust in a series of non-forceful releases, the specific kind of dust intersecting the forward edge location of the distribution of orbital debris, the specific kind of dust engulfing the distribution of orbital debris, the specific kind of dust formulated to generate a shock on the surfaces of debris pieces of the distribution of orbital debris, the shock increasing the drag on the distribution of orbital debris to induce reentry of the distribution of orbital debris.

2. The method as in claim 1 wherein said deploying comprises:
   equipping the spacecraft with the specific kind of dust.

3. The method as in claim 1 wherein said deploying comprises:
   determining a debris orbit and an edge of the distribution of orbital debris;
   setting the spacecraft in a pre-selected orbit with respect to the debris orbit; and
   configuring the spacecraft to release the specific kind of dust in the debris orbit at the edge, the specific kind of dust being released in a second pre-selected orbit in relation to at least a portion of the of orbital debris.

4. The method as in claim 3 further comprising:
   selecting the specific kind of dust based on dust properties, the dust properties causing a rate of decay of the orbit altitude of the specific kind of dust to be roughly synchronized with a rate of decay of the distribution of orbital debris.

5. The method as in claim 1 further comprising:
   determining an amount of the specific kind of dust based on an expected spatial extent of the specific kind of dust, the position of the distribution of orbital debris, and the amount of time of the interaction of the specific kind of dust with the distribution of orbital debris.

6. The method as in claim 5 further comprising:
   determining the orbital lifetime of the specific kind of dust based on the dust properties.

7. The method as in claim 5 further comprising:
   adjusting the characteristics of the specific kind of dust to affect a pre-selected subset of the distribution of orbital debris.

8. The method as in claim 1 further comprising:
   changing the altitude of the distribution of orbital debris to a pre-selected altitude, the pre-selected altitude being sufficient to deorbit the distribution of orbital debris based on the Earth's natural drag.

9. A system for inducing rapid reentry of orbital debris comprising:
   means for determining a forward edge location of the distribution of orbital debris, the distribution of orbital debris having an edge of pre-selected altitude; and
   means for intentionally deploying, from a spacecraft, a specific kind of dust in a series of non-forceful releases, the specific kind of dust intersecting the forward edge location of the distribution of orbital debris, the specific kind of dust engulfing the distribution of orbital debris, the specific kind of dust formulated to generate a shock on the surfaces of debris pieces of the distribution of orbital debris, the shock increasing the drag on the distribution of orbital debris to induce reentry of the distribution of orbital debris.

10. The system as in claim 9 wherein said means for deploying comprises:
    means for equipping the spacecraft with the specific kind of dust.

11. The system as in claim 9 wherein said means for deploying comprises:
    means for determining an orbit altitude band of the distribution of orbital debris;
    means for delivering the spacecraft to approximately a pre-selected orbit; and
    means for configuring the spacecraft to release the specific kind of dust into the orbital altitude band at the forward edge location, the specific kind of dust rotating in a pre-selected relation to at least a portion of the distribution of orbital debris.

12. The system as in claim 11 further comprising:
    means for selecting the specific kind of dust based on dust properties, the dust properties causing a rate of decay of the orbit altitude of the specific kind of dust to be roughly synchronized with a rate of decay of the distribution of orbital debris.

13. The system as in claim 9 further comprising:
    means for determining an amount of the specific kind of dust based on an expected spatial extent of the specific kind of dust, the position of the distribution of orbital debris, and the amount of time of the interaction of the specific kind of dust with the distribution of orbital debris.

14. The system as in claim 13 further comprising:
    means for determining the lifetime of the specific kind of dust based on dust properties.

15. The system as in claim 13 further comprising:
    means for adjusting the characteristics of the specific kind of dust to affect a pre-selected subset of the distribution of orbital debris.

16. The system as in claim 9 further comprising:
means for changing the altitude of the distribution of orbital debris to a pre-selected altitude, the pre-selected altitude being sufficient to deorbit the distribution of orbital debris based on the Earth's natural drag.

* * * * *